Patented Jan. 21, 1941

2,229,533

UNITED STATES PATENT OFFICE 2,229,533

ORGANIC COMPOUNDS HAVING ANESTHETIC PROPERTIES

Lewis A. Walter, East Orange, and Russel J. Fosbinder, Short Hills, N. J., assignors to The Maltbie Chemical Company, Newark, N. J., a corporation of New Jersey No Drawing. Application February 11, 1939, Serial No. 255,872

5 Claims. (Cl. 260—294)

This invention relates to a novel class of organic compounds which are specially useful as anesthetics, more especially local anesthetics. More particularly the invention relates to compounds of the class amino benzoic esters of β-2-piperidyl ethanol.

Compounds forming the subject-matter of the present invention have been found to possess desirable anesthetic properties and activity, and to produce prompt anesthesia by subcutaneous, by intraspinal and by topical application to mucous membranes and similar surfaces.

The usefulness and desirability of these compounds as local anesthetics has been established by extensive and authoritative pharmacological and toxicological procedure and by comparison of their physiological behavior and characteristics with the well-known and widely used compounds cocaine, procaine and metycaine.

The amino-substituted benzoyl esters of the class described may form dihydrochlorides under suitable conditions, in addition to the monohydrochlorides. In general, however, the monohydrochlorides have been found preferable to the dihydrochlorides, as being less acid in reaction. The acid salts hereinbelow described, as well as the basic compounds, are also well defined non-hygroscopic compounds.

The mono hydrochloride salts of the class referred to have been found to possess the advantageous property of dissolving in water to form aqueous solutions which are nearly neutral in reaction. This property substantially increases the chemical stability of the solution and tends to reduce irritation and other undesired effects of the application of the compound.

The compounds according to our invention have the general formula:

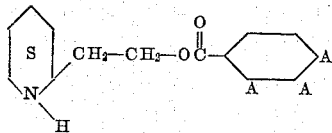

where one of the A's is an amino group and the other A's are hydrogen. In the formation of the mono hydrochloride compounds previously referred to, the hydrogen and chloride ions are attached to the nitrogen of the more basic piperidine ring.

While the free bases are only slightly soluble in water, the mono hydrochlorides are substantially soluble in aqueous solution at ordinary temperatures, thus facilitating their use as local anesthetics in suitable or required concentrations.

The amino benzoyl esters of β-2-piperidyl ethanol may, in general, be prepared by reacting the hydrochloride of the amino alcohol with a mono nitro substituted benzoyl chloride in chloroform solution at moderate temperatures. The above reaction is followed by catalytic reduction or other suitable methods for reducing a nitro group to an amino group, thus forming the corresponding amino esters.

Another method of preparing these compounds is to react a pyridino alcohol with the nitro substituted benzoyl chloride as above, and then hydrogenate the resulting product to the corresponding piperidyl amino benzoic ester by any suitable catalytic method of reduction. However, the first method described above is, in general, the preferred procedure.

The invention will now be illustrated by the following specific examples:

EXAMPLE 1.—*Preparation of β-2-ethyl piperidyl p-amino benzoate hydrochloride*

7 grams of β-2-piperidino ethanol, prepared according to the method originally devised by Ladenburg (Ber., 24, 1618, 1891), are dissolved in 200 cc. of anhydrous chloroform and saturated with dry hydrochloric acid, converting this compound to the hydrochloride. Then 14 grams (an excess) of p-nitro benzoyl chloride are added to this solution and the mixture refluxed for 2 hours. The chloroform is then removed by heating on a water bath, and the residue shaken with 90 cc. of cold water. The excess p-nitro benzoic acid is insoluble and is filtered off, the nitro ester being soluble in the solution. Sodium carbonate is then added in suitable quantity to liberate and precipitate the basic nitro ester. The nitro ester is then extracted with ether, dried over potassium carbonate and precipitated as the hydrochloride with dry hydrochloric acid gas. The oily hydrochloride is then dissolved in 75 cc. of absolute alcohol and, on chilling, crude material separates, having a melting point about 198–205° C. The crude ester is then dissolved in about 175 cc. of absolute alcohol and, on cooling, there is separated the pure nitro ester hydrochloride having a melting point of 205–206° C. Analysis for chlorine: found, 11.05%; theoretical 11.26%.

3 grams of the nitro ester hydrochloride are dissolved in 75 cc. of glacial acetic acid and shaken in an atmosphere of hydrogen with the addition of 0.2 gram $PtO_2$ catalyst. Following an initial period of incidence of 2 to 3 minutes the theoretical amount of hydrogen is taken up in about 10 minutes. The catalyst is filtered off and the acetic acid removed by distillation under reduced pressure on a water bath. The solid residue is then recrystallized from absolute alcohol, in which it is quite insoluble. The resulting product is crystalline, light cream in color, and is substantially pure β-2-ethyl piperidyl p-amino benzoate hydrochloride, having a melting point of 243–245° C. and the formula:

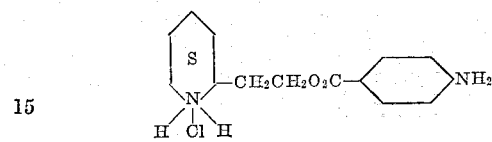

Analysis for chlorine: found, 12.20%; theoretical 12.45%.

EXAMPLE 2.—*Preparation of β-2-piperidyl m-amino benzoate hydrochloride*

16 grams of a crude mixture of meta nitrobenzoyl chloride and meta nitro benzoic acid are refluxed with 150 cc. of sulfonyl chloride for 4 hours, and the excess thionyl chloride is removed under reduced pressure on a water bath. The residue remaining is dissolved in 150 cc. of dry chloroform and refluxed with a solution containing 15 grams of β-2-piperidyl ethanol in chloroform, the solution being previously saturated with dry hydrochloric acid gas. After refluxing for 5 hours the chloroform is distilled off and the residue recrystallized twice from absolute alcohol. The second recrystallization yields crystalline material of melting point 168–171° C. and is the meta nitro benzoate of β-2-piperidino ethanol hydrochloride. Analysis for chlorine: found, 10.86%, 10.96%; theoretical, 11.26%.

3 grams of the nitro ester in 60 cc. of glacial acetic acid are reduced with 0.1 gram of PtO₂ catalyst, the reduction being complete in about 20 minutes. The solution is filtered to remove the catalyst and the acetic acid is distilled off under reduced pressure on a water bath. The residue is then dissolved in 25 cc. of absolute alcohol and chilled. A second recrystallization gives white crystals melting at 176–180° C., and consisting of the m-amino benzoate of β-2-piperidino ethanol hydrochloride having the formula:

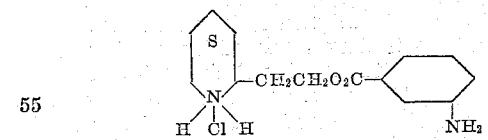

Analysis for chlorine: found, 12.28%; theoretical, 12.45%.

EXAMPLE 3.—*Preparation of β-2-piperidyl o-amino benzoate hydrochloride*

7 grams of o-nitro benzoic acid are refluxed with 200 cc. of thionyl chloride for 5 hours. The excess thionyl chloride is then removed by distillation under reduced pressure and the residue refluxed with a solution of 6 grams of β-2-piperidino ethanol in 200 cc. of chloroform, the solution having been previously treated with dry hydrochloric acid gas. The mixture is then refluxed for 1 hour and allowed to stand overnight. The chloroform is removed by distillation on a water bath and the residue dissolved in 50 cc. of absolute alcohol and diluted with 50 cc. of absolute ether. On chilling, a crude product, of melting point 130–137° C. separates. This product is recrystallized from the same amount of solvent and yields impure β-piperidyl ethyl o-nitro benzoate hydrochloride. Analysis for chlorine: found, 11.46%; theoretical, 11.26%.

4 grams of the foregoing o-nitro ester are dissolved in 30 cc. of glacial acetic acid and reduced with 0.1 gram of PtO₂ catalyst. The solution is filtered and the acetic acid removed by distillation under reduced pressure. The residue is crystallized from 75 cc. of absolute alcohol and yields pure, white crystals of melting point 205–207° C., consisting of the compound β-2-piperidyl ethyl o-amino benzoate hydrochloride, having the formula:

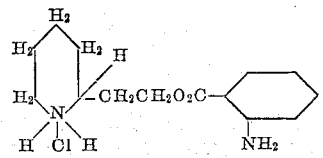

Analysis for chlorine: found, 12.3%; theoretical, 12.45%.

The use of the term "piperidyl" in the present specification and claims is believed to be in accord with an accepted and accurate system of organic nomenclature; and the term, as used herein, is identical in significance with the term "piperidine," which might be employed instead, in accordance with the principles set forth in "A System of Organic Nomenclature" by Patterson and Curran, J. Am. Chem. Soc. 39, 1623–37, and certain modifications as explained in the Introduction to the Subject Index of Chemical Abstracts, vols. 31 and 32. Thus, the compounds of the present invention, represented by the formulas set forth herein, may be accurately designated as primary amino benzoic esters of β-2-piperidine ethanol.

The description and examples given above are the best embodiments of our invention now known to us, but it is to be understood that the invention is not necessarily or specifically limited thereto, but may be carried out in other ways without departure from its spirit and within the following claims.

We claim:

1. The organic compounds of the class consisting of compounds of the formula:

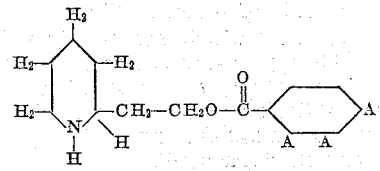

where one A is a primary amino group and the other A's are hydrogen, and the water-soluble salts thereof.

2. An anesthetic compound comprising a water-soluble salt of a mono primary amino benzoate according to the formula set forth in claim 1.

3. β-2-piperidyl ethyl p-amino benzoate hydrochloride.

4. β-2-piperidyl ethyl m-amino benzoate hydrochloride.

5. β-2-piperidyl ethyl o-amino benzoate hydrochloride.

LEWIS A. WALTER.
RUSSEL J. FOSBINDER.